United States Patent

Nishikawa et al.

[11] Patent Number: 5,466,481
[45] Date of Patent: Nov. 14, 1995

[54] SUBSTRATE FOR MAGNETIC DISK

[75] Inventors: Masao Nishikawa; Nobuyuki Fujii, both of Ibaragi, Japan

[73] Assignee: NEC Corporation, Tokyo, Japan

[21] Appl. No.: 369,337

[22] Filed: Jan. 6, 1995

Related U.S. Application Data

[62] Division of Ser. No. 153,964, Nov. 18, 1993, abandoned.

[30] Foreign Application Priority Data

Nov. 18, 1992 [JP] Japan ................................. 4-308404

[51] Int. Cl.$^6$ ........................................................ B05D 5/12
[52] U.S. Cl. .......................... 427/130; 427/131; 427/132; 427/431; 427/436
[58] Field of Search .................................. 427/130, 131, 427/132, 431, 436

[56] References Cited

U.S. PATENT DOCUMENTS

| | | | |
|---|---|---|---|
| 3,695,854 | 10/1972 | Egger et al. | 428/687 |
| 4,072,781 | 2/1978 | Shirahoto et al. | 428/336 |
| 4,539,264 | 9/1985 | Yazawo et al. | 428/621 |
| 5,017,337 | 5/1991 | Nabae et al. | 428/687 |
| 5,134,038 | 7/1992 | Baseman et al. | 428/611 |
| 5,405,646 | 4/1995 | Nanis | 427/131 |

Primary Examiner—Benjamin Utech
Attorney, Agent, or Firm—Sughrue, Mion, Zinn, Macpeak & Seas

[57] ABSTRACT

A substrate for a magnetic disk having minute semi-spherical raised portions formed over the entire surface by a non-electrolytic plating process, an electrolytic plating process or plating nuclei containing palladium, gold, silver, or copper. The substrate is obtained by comprising steps of forming a Ni—P intermediate layer by Ni—P plating on an aluminum substrate, finishing the Ni—P intermediate layer, dipping the substrate in a plating solution to effect palladium plating to form a Pd plating layer and forming a Ni—P plating layer to form minute semi-spherical raised portions over an entire surface of the Pd plating layer.

2 Claims, 1 Drawing Sheet

SUBSTRATE FOR MAGNETIC DISK

This is a Filewrapper Divisional of application Ser. No. 08/153,964 filed Nov. 18, 1993, now abandoned.

BACKGROUND OF THE INVENTION

This invention relates to a substrate for a magnetic disk and, more particularly, to a substrate for a magnetic disk for high density recording.

Among recent magnetic media (i.e., magnetic disks) for magnetic disk apparatuses, those for high density recording are mainly commonly called thin film magnetic disks having magnetic thin films formed as magnetic recording layer by a plating process, a spattering process or a deposition process.

Such a thin film magnetic disk employs a substrate with the surface thereof polished mechanically to prevent adsorption of magnetic head and magnetic disk to each other. The polishing is usually done by a method called texturing, in which polishing grains are formed circumferentially by a mechanical polishing process.

The process of texturing is an art of forming circumferential polishing grains on the substrate surface. In this art, the surface state can be controlled with conditions of the abrasive grain and the process.

In the prior art magnetic disk, polishing grains are formed concentrically on the substrate surface. However, the repetition of the operation of contact start and stop (CSS) between the magnetic head and magnetic disk leads to an increase of the frequency of adsorption of the magnetic head to the magnetic disk. To decrease this adsorption, the direction of the polishing grains is randomized by slightly deviating the grains from the concentric circles.

While in the prior art magnetic disk the adsorption is improved by reducing the area of contact between the magnetic head and magnetic disk through randomization of the direction of the polishing grains on the substrate surface by causing slight deviation of the grains from the concentric circles, there is a limit on the reduction of the contact area by such method. Therefore, in order to prevent the adsorption of the magnetic head, it is necessary to increase considerably the surface roughness of the substrate (i.e., the depth of the polishing nodes). Increasing the surface roughness of the substrate leads to the possibility of error generation when the information is read out from the magnetic disk or the reduction of the durability of the magnetic disk.

In the U.S. Pat. No. 5,134,038, there is disclosed a magnetic storage medium composed a non-wet-table substrate upon which a transient liquid metal layer is deposited and maintained as a distribution of discontinuous liquid features. However, to obtain the magnetic storage medium it is required to melt the metal at high temperature and sometimes to process the material under the vacuum condition.

SUMMARY OF THE INVENTION

An object of the present invention is therefore to provide a substrate for a magnetic disk which is easily obtained and has a little adsorption characteristics.

According to the present invention, there is provided a substrate for a magnetic disk having minute semi-spherical raised portions formed over the entire surface by a non-electrolytic plating process, an electrolytic plating process or plating nuclei containing palladium, gold, silver, or copper.

The substrate is obtained by comprising steps of forming a Ni—P intermediate layer by Ni—P plating on an aluminum substrate, finishing the Ni—P intermediate layer, dipping the substrate in a plating solution to effect palladium plating to form a Pd plating layer and forming a Ni—P plating layer to form minute semi-spherical raised portions over an entire surface of the Pd plating layer.

A magnetic disk is obtained by forming a Co—P magnetic plating layer as a magnetic film on the surface of the substrate by a non-electrolytic plating process, forming a $SiO_2$ protective film on the Co—P magnetic plating layer by coating an isopropyl alcohol solution containing tetrahydroxysilane dissolved therein by a spin coat process and sintering the coating and forming on the protective film a lubrication film layer by spin coating a fluorine oil type lubricant.

PREFERRED EMBODIMENTS

Now, the embodiment of the present invention will be described with reference to the drawings.

Figure 1:
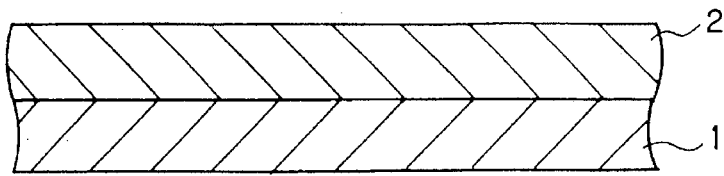
FIGS. 1(a) and 1(b) are sectional views showing successive steps in an embodiment of the present invention.
Figure 1:
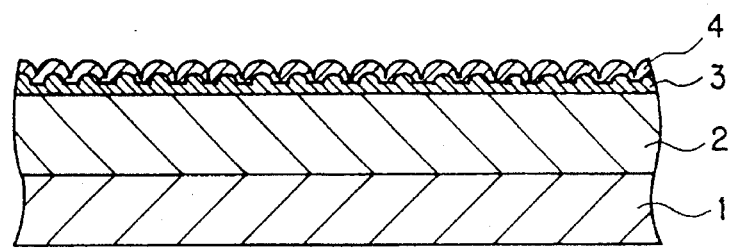

In forming the substrate for a magnetic disk according to the present invention, as shown in FIG. 1(a) on an aluminum substrate 1 a Ni—P intermediate layer 2 is formed with Ni—P plating to a thickness of 10 to 15 microns. The plating is then finished by mechanical process. Then, as shown in FIG. 1(b) the system is dipped in a plating solution as shown in Table 1 to effect palladium plating, thus forming a Pd plating layer 3. Thereafter, a Ni—P plating layer 4 is formed, thus forming minute semi-spherical raised portions over the entire surface.

Figure 2:
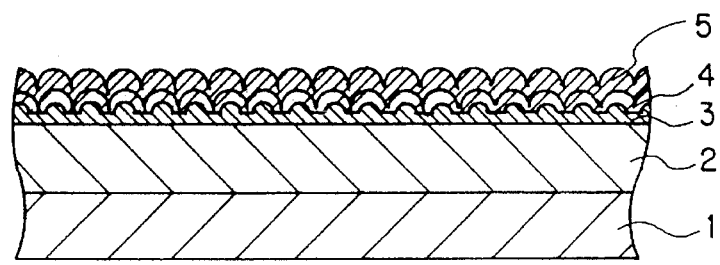
FIGS. 2(a) and 2(b) are sectional views showing successive steps of manufacture of a magnetic disk using the embodiment shown in FIGS. 1(a) and 1(b).
Figure 2:
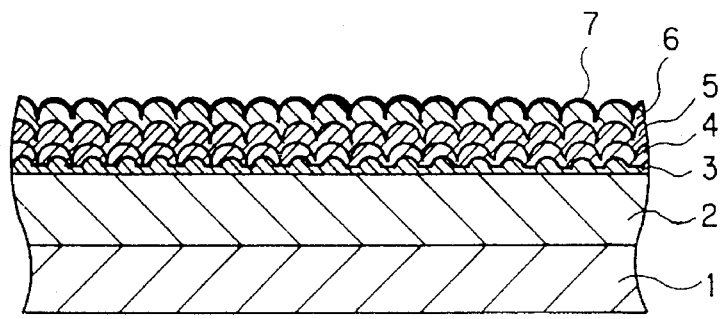

In the formation of the magnetic disk, as shown in FIG. 2(a) on the substrate shown in FIG. 1(b) a Co—P magnetic plating layer 5 which is a magnetic film is formed by a non-electrolytic plating process. Then, as shown in FIG. 2(b), a $SiO_2$ protective film 6 is formed by coating an isopropyl alcohol solution containing tetrahydroxysilane dissolved therein to a thickness of about 600 angstroms by a spin coat process and then sintering the coating. On the protective film thus formed a lubrication film layer 7 is formed by spin coating a fluorine oil type lubricant, thus completing the magnetic disk.

Table 2 shows the results of measurements of the frictional coefficient of a magnetic disk manufactured by using the above embodiment of the substrate and that of a magnetic disk manufactured by using the prior art substrate. The measurement was done by using a Mn—Zn ferrite magnetic head. In the measurement, the static frictional coefficient was measured right after loading the magnetic head on the magnetic disk and after leaving the system for 48 hours subsequent to the loading of the magnetic disk.

As is seen from Table 2, the frictional coefficient of the magnetic disk manufactured by using the embodiment of the substrate is smaller, particularly after the system has been left for 48 hours, than the frictional coefficient of the magnetic disk manufactured by using the prior art substrate, thus indicating pronounced adsorption prevention effect.

As has been described in the foregoing, with the substrate for a magnetic disk according to the present invention minute semi-spherical raised portions are formed over the entire surface by a non-electrolytic or an electrolytic plating process. It is thus possible to reduce the frictional coefficient of the magnetic disk manufactured by using this substrate, thus permitting prevention of the adsorption of the magnetic head to the magnetic disk.

The height, size, shape and density of the raised portions of the substrate for a magnetic disk according to the invention, vary with the conditions, under which the magnetic disk is used. Their optimum values are selected in dependence on such conditions as the kind, structure, material, floating degree and rotational speed of the magnetic disk, kinds and thicknesses of protective film and lubrication films of the magnetic disk, etc. The surface shape of unevenness of the substrate is determined by the conditions of non-electrolytic plating providing catalyst and subsequent non-electrolytic Ni plating.

TABLE 1

| INGREDIENT | CONCEN-TRATION |
|---|---|
| PALLADIUM (2) CHLORIDE | 0.01 mol/l |
| ETHYENEDIAMINE | 0.08 mol/l |
| SODIUM HYDROGEN PHOSPHATE | 0.05 mol/l |
| 2,2-THIODIACETIC ACID | 30 mg/l |
| HYDROCHLORIC ACID | 5 ml/l |

(PH = 6 BATH TEMPERATURE 60° C.)

TABLE 2

| | | FRICTIONAL COEFFICIENT | |
|---|---|---|---|
| DISK | NO. | NO LEAVING | AFTER 48 Hrs |
| MAGNETIC DISK ACCORDING TO EMBODIMENT | 1 | 0.24 | 0.32 |
| | 2 | 0.18 | 0.24 |
| | 3 | 0.15 | 0.20 |
| PRIOR MAGNETIC DISK | 1 | 0.25 | 0.96 |
| | 2 | 0.28 | 1.34 |

TABLE 2-continued

| | | FRICTIONAL COEFFICIENT | |
|---|---|---|---|
| DISK | NO. | NO LEAVING | AFTER 48 Hrs |
| | 3 | 0.26 | 1.04 |

What is claimed is:

1. A method for making a substrate comprising steps of:

forming a Ni—P intermediate layer by Ni—P plating on an aluminum substrate;

processing said Ni—P intermediate layer;

dipping said substrate in a plating solution to effect palladium plating to form a Pd plating layer; and forming a Ni—P plating layer to form semi-spherical raised portions over an entire surface of said Pd plating layer.

2. A method for making a magnetic disk comprising steps of:

forming a Ni—P intermediate layer by Ni—P plating on an aluminum substrate;

processing said Ni—P intermediate layer;

dipping said substrate in a plating solution to effect palladium plating to form a Pd plating layer;

forming a Ni—P plating layer to form semi-spherical raised portions over an entire surface of said Pd plating layer;

forming a Co—P magnetic plating layer as a magnetic film on the surface of said substrate by a non-electrolytic plating process;

forming a $SiO_2$ protective film on said Co—P magnetic plating layer by coating an isopropyl alcohol solution containing tetrahydroxysilane dissolved therein by a spin coat process and sintering the coating; and forming on said protective film a lubrication film layer by spin coating a fluorine oil lubricant.

* * * * *